US012649624B2

(12) United States Patent
Austrheim

(10) Patent No.: US 12,649,624 B2
(45) Date of Patent: Jun. 9, 2026

(54) VEHICLE

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 930 days.

(21) Appl. No.: 17/758,428

(22) PCT Filed: Nov. 18, 2020

(86) PCT No.: PCT/EP2020/082523
§ 371 (c)(1),
(2) Date: Jul. 6, 2022

(87) PCT Pub. No.: WO2021/139917
PCT Pub. Date: Jul. 15, 2021

(65) Prior Publication Data
US 2023/0025507 A1 Jan. 26, 2023

(30) Foreign Application Priority Data

Jan. 7, 2020 (NO) .................................. 20200015

(51) Int. Cl.
*B65G 1/04* (2006.01)
*B25J 5/02* (2006.01)
(Continued)

(52) U.S. Cl.
CPC .............. *B65G 1/0464* (2013.01); *B25J 5/02* (2013.01); *B65G 1/065* (2013.01); *G05D 1/0011* (2013.01); *B65G 2207/30* (2013.01)

(58) Field of Classification Search
CPC .. B65G 1/0464; B65G 1/065; B65G 2207/30; B65G 1/0478; B65G 2201/0235; B65G 1/0414; B25J 5/02
See application file for complete search history.

(56) References Cited

U.S. PATENT DOCUMENTS

2023/0040663 A1 2/2023 Fjeldheim et al.

FOREIGN PATENT DOCUMENTS

CA 3044486 A1 * 8/2018 ........... B65G 1/0492
CN 101450609 A 6/2009
(Continued)

OTHER PUBLICATIONS

CN110255038 EN translation (Year: 2019).*
(Continued)

*Primary Examiner* — Jacob S. Scott
*Assistant Examiner* — Erin Morris
(74) *Attorney, Agent, or Firm* — Baker Botts L.L.P.

(57) ABSTRACT

A remotely operated vehicle for moving on a rail system includes a first set of wheels, a second set of wheels, a wheel displacement assembly, and a wheel drive assembly. The rail system includes a first set of parallel rails and a second set of parallel rails arranged perpendicular to the first set of rails. The first set of wheels includes a first pair of wheels and a second pair of wheels, the first and second pairs of wheels arranged on opposite sides of a vehicle frame, allowing movement of the vehicle along a first direction on the rail system during use. The second set of wheels includes a third pair of wheels and a fourth pair of wheels, the third and fourth pairs of wheels arranged on opposite sides of the vehicle frame, allowing movement of the vehicle along a second direction on the rail system during use. The second direction is perpendicular to the first direction. The wheel displacement assembly is mounted to the vehicle frame and arranged to move the second set of wheels in a vertical direction relative to the vehicle frame between a first position. The first set of wheels allows movement of the vehicle along the first direction, and a second position. The second set of wheels allows movement of the vehicle along the second direction. The wheel drive assembly includes a first (Continued)

(Detail C)

motor, a drive band, and a band drive wheel. The first motor is operatively connected to rotate the band drive wheel. The drive band interconnects the band drive wheel and the third pair of wheels. The third pair of wheels and the first motor are mounted to a cross-plate which extends horizontally and is arranged to move vertically as part of the wheel displacement assembly. The third pair of wheels and the band drive wheel are attached to the cross-plate such that the cross-plate supports the third pair of wheels and the band drive wheel are in a fixed spatial configuration where each wheel of the third pair of wheels is located at an end portion of the cross-plate and the band drive wheel is positioned at a central portion of the cross-plate.

12 Claims, 10 Drawing Sheets

(51) Int. Cl.
B65G 1/06            (2006.01)
G05D 1/00            (2024.01)

(56) References Cited

FOREIGN PATENT DOCUMENTS

| | | | | | | |
|---|---|---|---|---|---|---|
| CN | 103171851 | A | | 6/2013 | | |
| CN | 103171851 | B | * | 5/2015 | | |
| CN | 104837747 | A | | 8/2015 | | |
| CN | 105059811 | A | * | 11/2015 | ........... | B65G 1/0464 |
| CN | 105059811 | B | * | 12/2017 | ........... | B65G 1/0464 |
| CN | 208699710 | U | | 4/2019 | | |
| CN | 110092324 | A | | 8/2019 | | |
| CN | 110239871 | A | | 9/2019 | | |
| CN | 110255038 | A | * | 9/2019 | ........... | B65G 1/0492 |
| CN | 114394357 | A | * | 4/2022 | ........... | B65G 1/0414 |
| CN | 110092324 | B | * | 7/2024 | ........... | B66F 7/0641 |
| EP | 4097031 | B1 | | 8/2025 | | |
| JP | S61127025 | A | | 8/1986 | | |
| JP | H08324772 | A | | 12/1996 | | |
| NO | 317366 | B1 | | 10/2004 | | |
| WO | 2014075937 | A1 | | 5/2014 | | |
| WO | 2014090684 | A1 | | 6/2014 | | |
| WO | WO-2014118716 | A2 | * | 8/2014 | ............. | B65G 1/065 |
| WO | 2015019055 | A1 | | 2/2015 | | |
| WO | 2015193278 | A1 | | 12/2015 | | |
| WO | 2017153583 | A1 | | 9/2017 | | |
| WO | 2018146304 | A1 | | 8/2018 | | |
| WO | 2018206478 | A1 | | 11/2018 | | |
| WO | 2019137866 | A1 | | 7/2019 | | |
| WO | 2019238694 | A1 | | 12/2019 | | |
| WO | WO-2019238703 | A1 | * | 12/2019 | ........... | B65G 1/0464 |
| WO | WO-2021175949 | A1 | * | 9/2021 | ........... | B65G 1/1375 |

OTHER PUBLICATIONS

CN105059811 EN translation (Year: 2015).*
CN_103171851 (Year: 2015).*
CN_105059811 (Year: 2017).*
CN_110092324 (Year: 2024).*
CN_114394357 (Year: 2022).*
Teng Yuhong, First Office Action for Chinese Patent Application No. CN2020800977903, dated Mar. 30, 2024, 15 pages, pub. by SIPO, Beijing, China.
Morohoshi, Keisuke, Notice of Reasons for Rejection for Japanese Patent Application No. 2022541642, dated Jun. 26, 2024, 11 pages, pub. by Japanese Patent Office.
Le Huy Anh, First Office Action for Vietnamese Patent Application No. VN1202204672, dated Apr. 26, 2024, 4 pages, pub. by Intellectual Property Office of Vietnam. Hanoi, VN.
Nora Lindner, International Preliminary Report on Patentability Chapter I issued in International Application No. PCT/EP2020/082523, dated Jul. 12, 2022, 8 pages, Geneva, Switzerland.
Charles Thibaut, First Examination Action for European Patent Application No. 20808398.0-1017, mailed Aug. 20, 2024, 8 pages, European Patent Office, Rijswijk, Netherlands.
Teng Yuhong, Second Office Action for Chinese Patent Application No. 2020800977903, dated Nov. 23, 2024, 14 pages, pub. by SIPO, Beijing, China.
International Search Report issued in International Application No. PCT/EP2020/082523, mailed Feb. 9, 2021 (5 pages).
Written Opinion issued in International Application No. PCT/EP2020/082523; Dated Feb. 9, 2021 (7 pages).
Search Report issued in Norwegian Application No. 20200015; Dated Jul. 26, 2020 (2 pages).
Anonymous, Office Action in KR1020227026699, mailed Aug. 6, 2025, 16 pages, Korean Intellectual Property Office, Daejeon, Korea.
Thibaut, Charles, Office Action in EP20808398.0, mailed Mar. 9, 2026, 5 pages, European Patent Office, Munich, Germany.

* cited by examiner

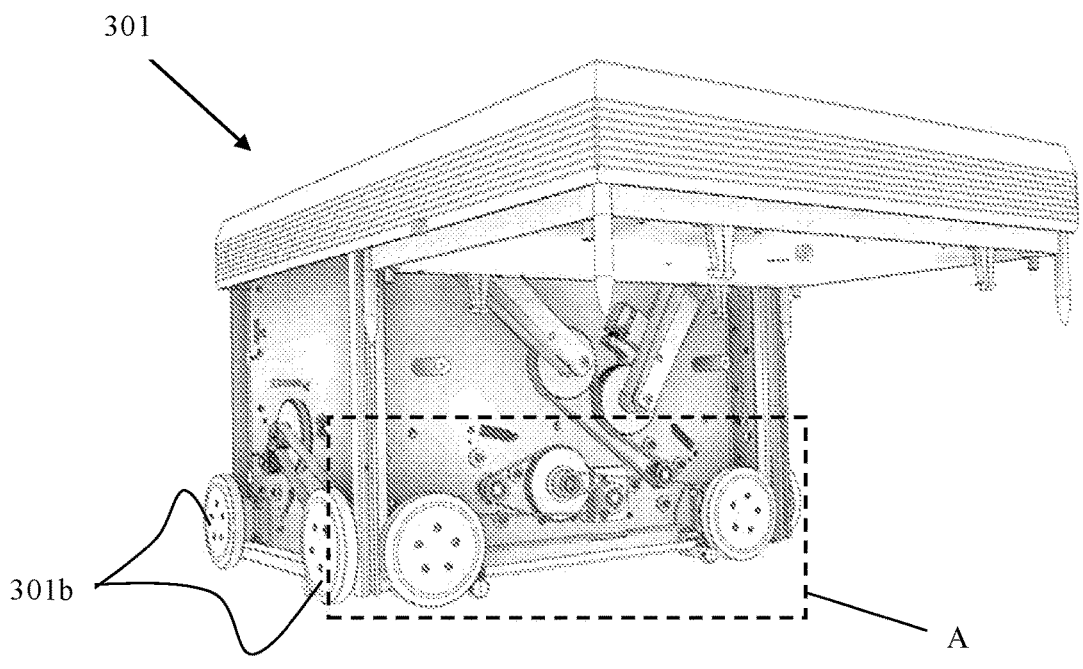
301
301b
A
Fig. 4a (Prior art)
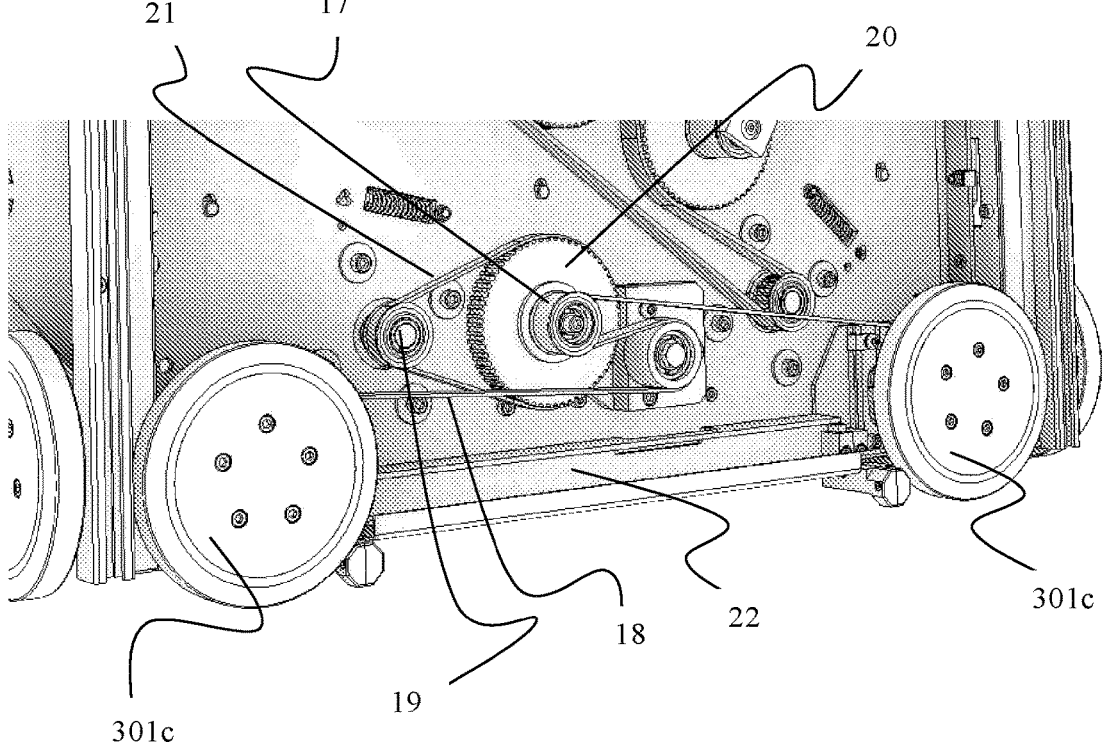
21    17    20
301c
301c    19    18    22
Fig. 4b (Detail A)

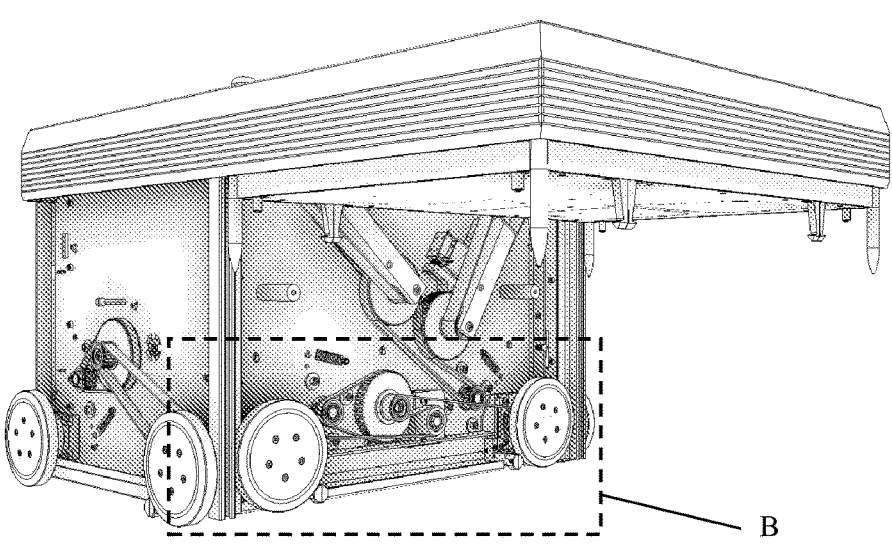
Fig. 4c
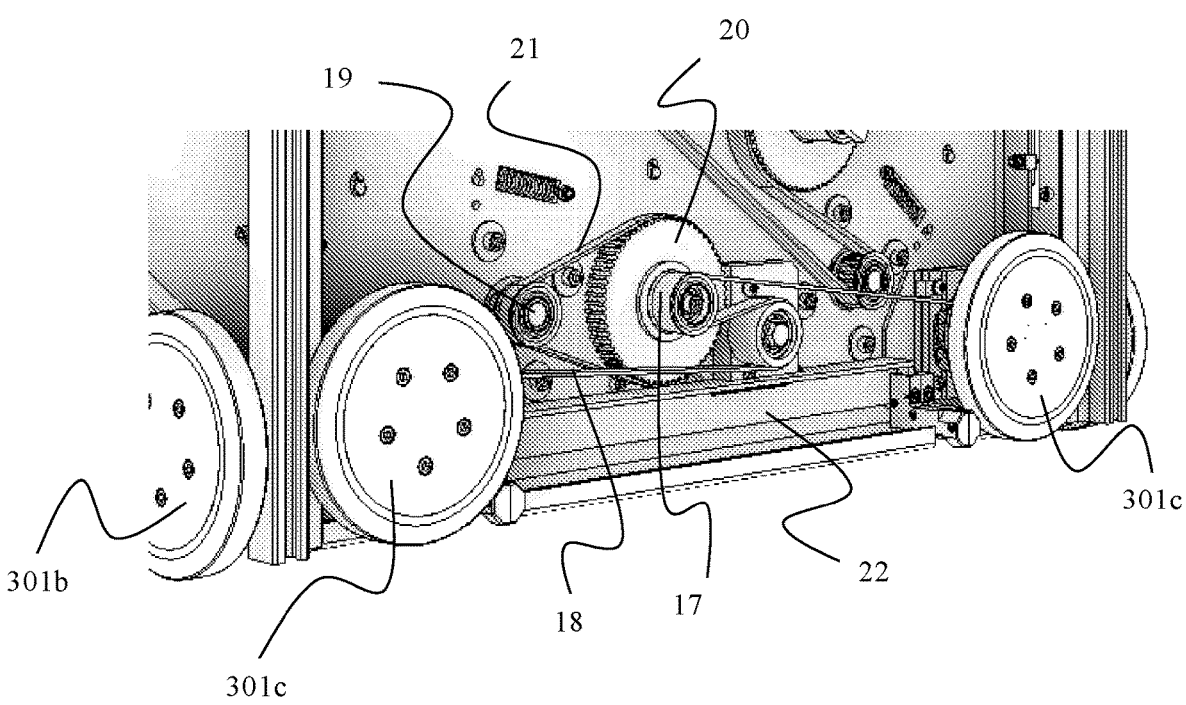
Fig. 4d (Detail B)

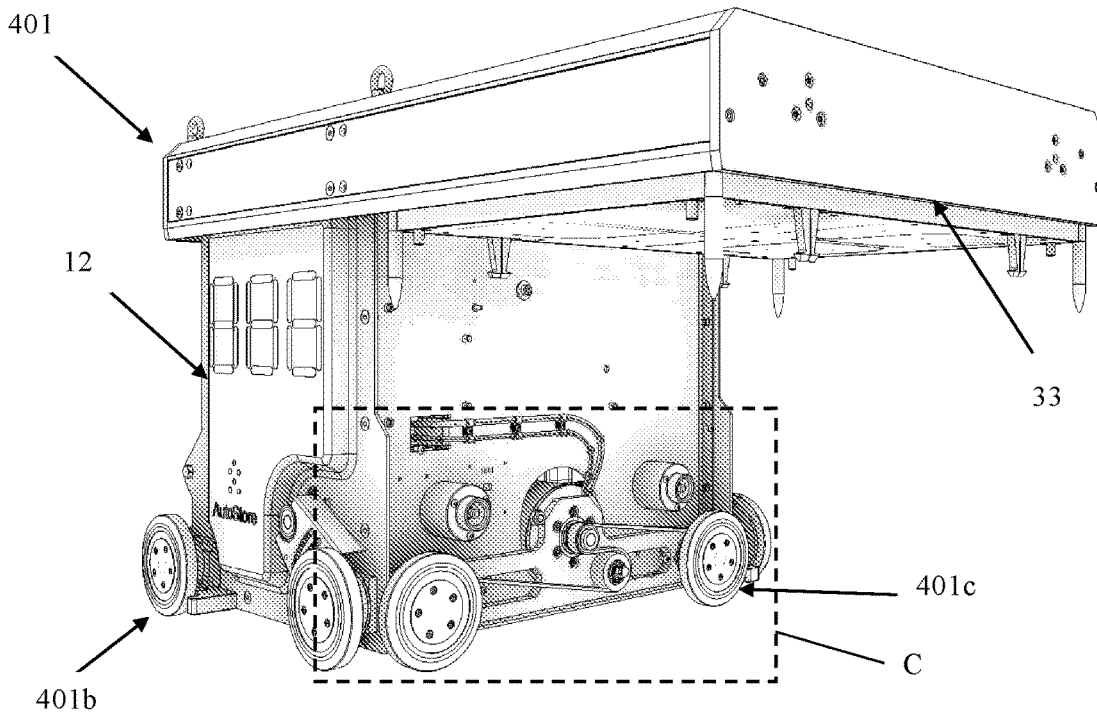
Fig. 5a
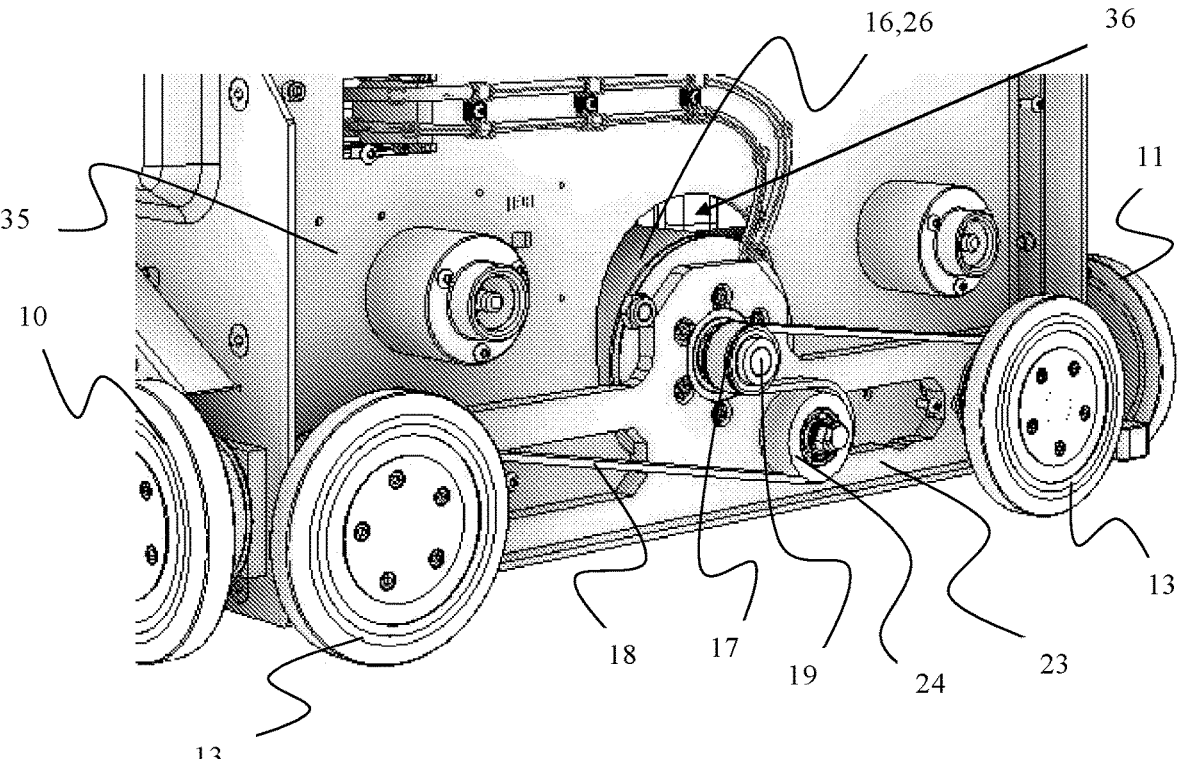
Fig. 5b (Detail C)

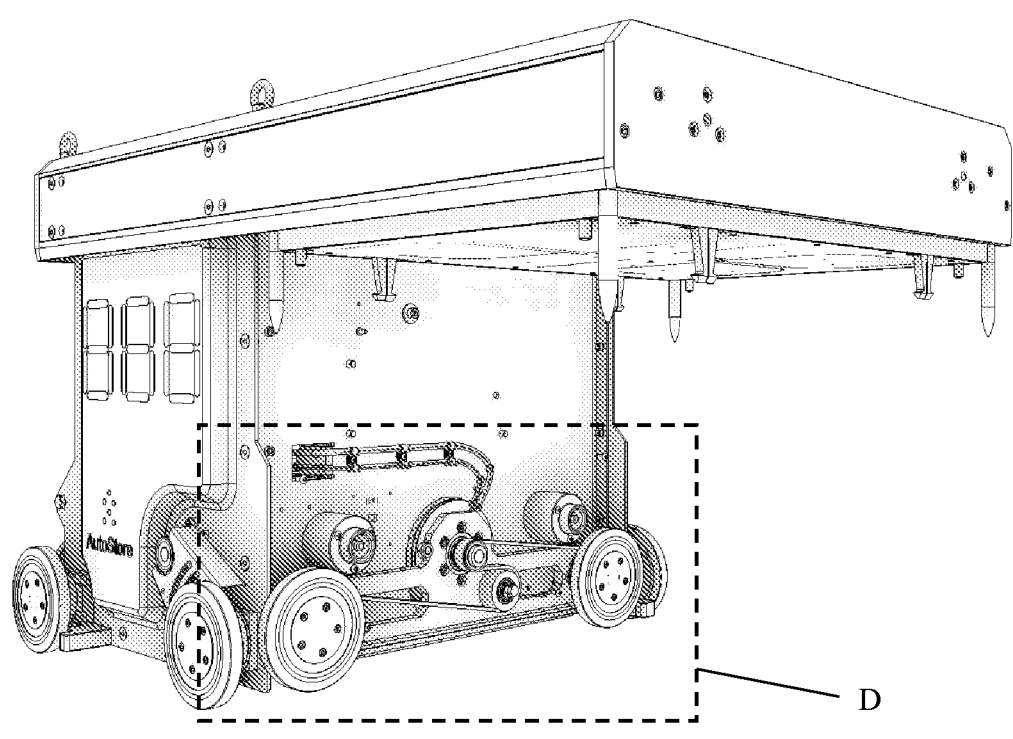
Fig. 6a
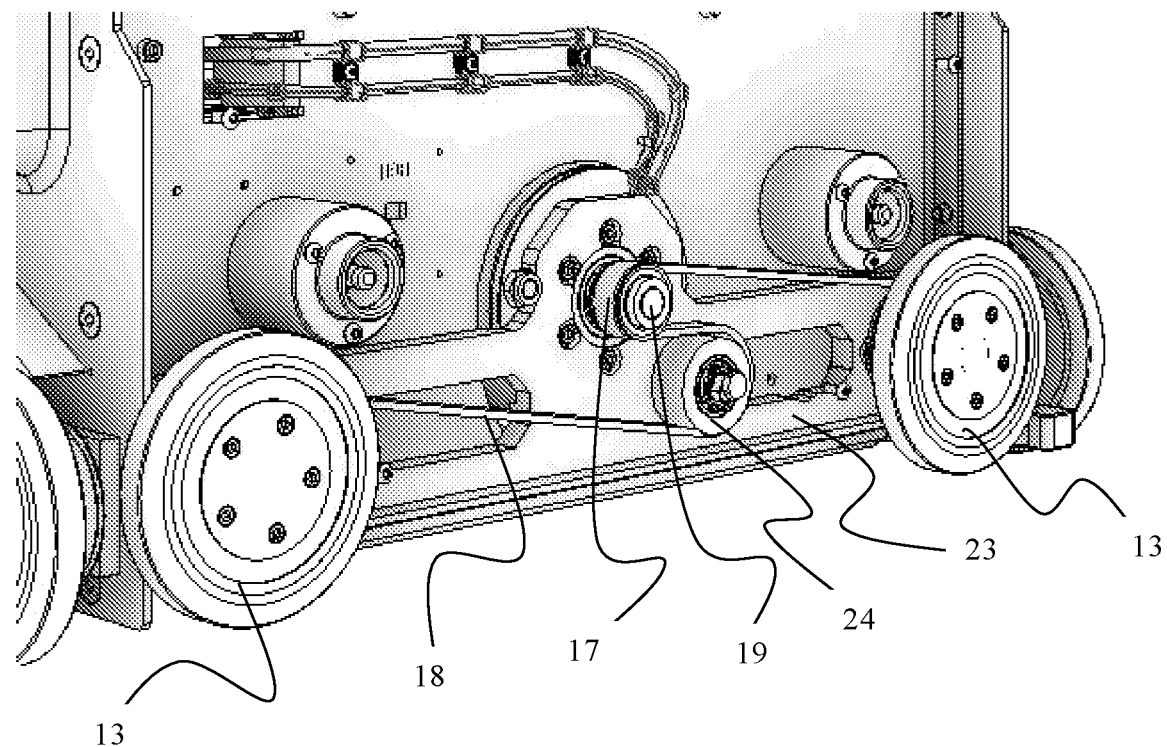
Fig. 6b (Detail D)

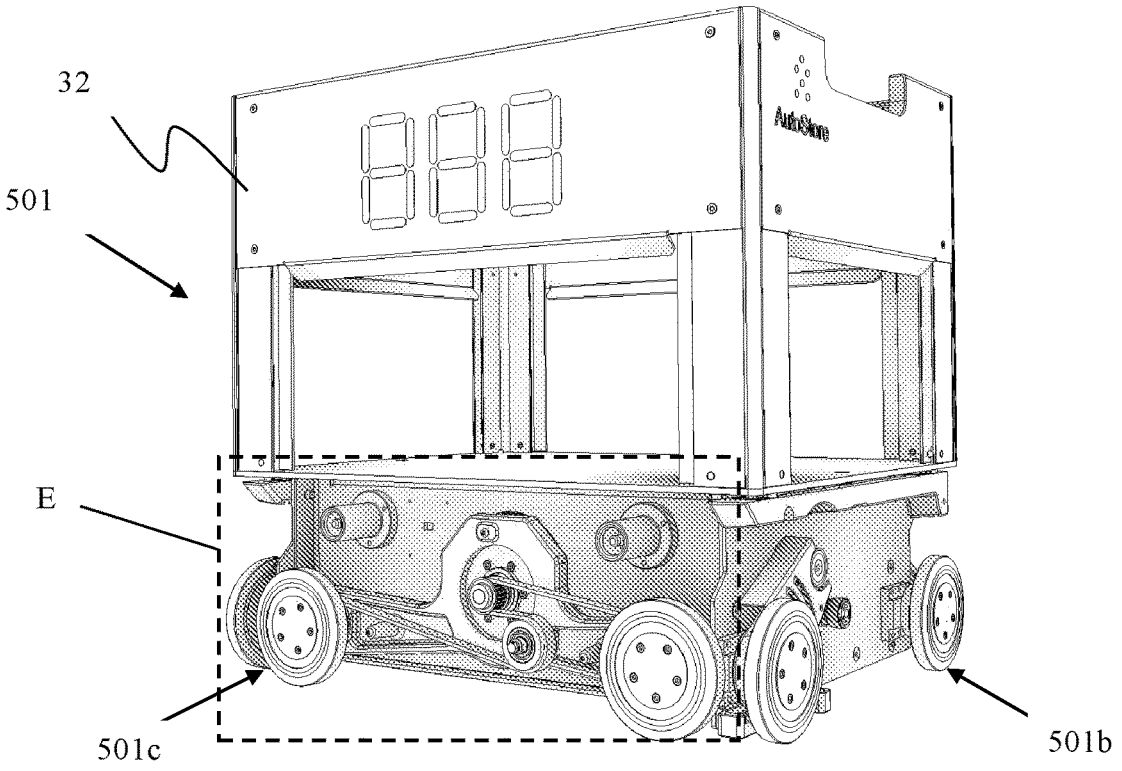
Fig, 8a
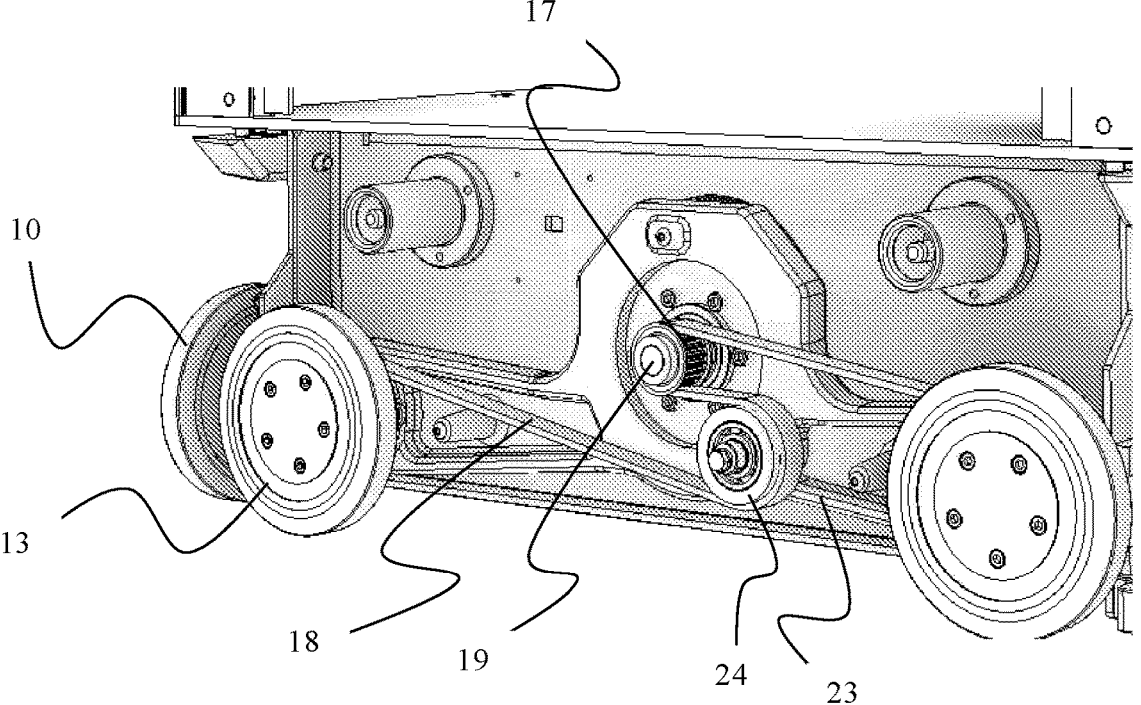
Fig. 8b (Detail E)

VEHICLE

FIELD OF THE INVENTION

The present invention relates to an automated storage and retrieval system for storage and retrieval of containers, in particular to a vehicle for use in such a system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

Further details of the prior art container handling vehicle 301 are shown in FIGS. 4a-4d. As discussed above, the vehicle features a first set of wheels 301b and a second set of wheels 301c for allowing movement of the container handling vehicle 301 upon a rail system 108. Each set of wheels comprises two pairs of wheels arranged on opposite sides of the vehicle body. The second set of wheels 301c is vertically displaceable relative to the first set of wheels 301b by a wheel displacement assembly, such that the first set of wheels 301b and the second set of wheels 301c can be selectively engaged with the respective set of rails 110, 111 of the rail system 108.

In FIGS. 4a and 4b, the second set of wheels is shown in a lowered position, and in FIGS. 4c and 4d, the second set of wheels is in a raised position.

The second set of wheels 301c is driven by a wheel drive assembly featuring an electric motor (not shown) having a drive shaft 19 operatively connected to a band drive wheel 17 and a first drive band 18 via a gear wheel 20 and a second drive band 21. The drive shaft 19, the band drive wheel 17 and the gear wheel 20 is mounted on the vehicle body in a fixed spatial relationship. The second set of wheels are mounted to, and held in a spaced relationship by, a wheel support 22.

During vertical displacement of the second set of wheels 301c between the lowered and the raised position, the second set of wheels 301*c* and the wheel support 22 will move relative to the band drive wheel 17, and the length of the first drive band 18 will extend or retract depending on the direction of the vertical displacement. The repeated extension/retraction of the first drive band 18 causes additional wear over time, and as a result the drive assembly is more service intensive than desired in that the drive belt must be replaced quite often.

The object of the present invention is to provide a container handling vehicle, wherein some of the disadvantages of the prior art vehicles are avoided or alleviated.

SUMMARY OF THE INVENTION

The present invention is defined by the attached claims and in the following:

In a first aspect, the present invention provides a remotely operated vehicle for moving on a rail system, the rail system comprising a first set of parallel rails and a second set of parallel rails arranged perpendicular to the first set of rails, the vehicle comprising a first set of wheels comprising a first pair of wheels and a second pair of wheels, the first and second pairs of wheels arranged on opposite sides of a vehicle frame, allowing movement of the vehicle along a first direction on the rail system during use;

a second set of wheels comprising a third pair of wheels and a fourth pair of wheels, the third and fourth pairs of wheels arranged on opposite sides of the vehicle frame, allowing movement of the vehicle along a second direction on the rail system during use, the second direction being perpendicular to the first direction;

a wheel displacement assembly mounted to the vehicle frame and arranged to move the second set of wheels in a vertical direction relative to the vehicle frame between a first position, wherein the first set of wheels allows movement of the vehicle along the first direction, and a second position, wherein the second set of wheels allows movement of the vehicle along the second direction; and a wheel drive assembly comprising a first motor, a drive band and a band drive wheel, the first motor operatively connected to rotate the band drive wheel, and the drive band interconnecting the band drive wheel and the third pair of wheels, wherein the third pair of wheels and the first motor are mounted to a cross-plate which extends horizontally and is arranged to move vertically as part of the wheel displacement assembly, the third pair of wheels and the band drive wheel being attached to the cross-plate such that the cross-plate supports the third pair of wheels and the band drive wheel in a fixed spatial configuration where each wheel of the third pair of wheels is located at an end portion of the cross-plate and the band drive wheel is positioned at a central portion of the cross-plate.

In other words, each wheel of the third pair of wheels is mounted to the cross-plate at opposite end portions of the cross-plate, and the band drive wheel is mounted at a central portion of the cross-plate located between the opposite end portions.

In other words, the drive band interconnects the band drive wheel and the third pair of wheels such that rotation of the band drive wheel may be transferred to the third pair of wheels via the drive band.

By having the third pair of wheels and the band drive wheel in a fixed spatial configuration the length of the drive band is constant during vertical movement of the third pair of wheels.

The drive band may be defined as following a drive band path interconnecting the band drive wheel and the third pair of wheels, and the drive band path is constant during movement of the second set of wheels between the first position and the second position.

The wheel displacement assembly may be defined as comprising the cross-plate. The term "cross-plate" is intended to comprise any frame, plate element or cross-beam suitable for mounting the third pair of wheels and the first motor in a fixed spatial configuration. The cross-plate may be horizontally extended, i.e. the cross-plate is more extended in the horizontal direction than in the vertical direction. The height of the cross-plate may be in the range of two to four times the radius of a wheel of the third pair of wheels.

In an embodiment of the vehicle, the first motor comprises a drive shaft, and the band drive wheel is connected to the drive shaft, such that the band drive wheel and the drive shaft have a common axis of rotation.

In an embodiment, the vehicle comprises an idler wheel mounted to the cross-plate such that the cross-plate supports the idler wheel, the third pair of wheels and the band drive wheel in a fixed spatial configuration, the idler wheel positioned in a central portion of the cross-plate and arranged to change the direction of the drive band such that a contact area between the band drive wheel and the drive band is extended. The idler wheel may be arranged to provide a directional change to the drive band.

In other words, the idler wheel is positioned or arranged to ensure that the drive band is in contact with the band drive wheel over a circumferential section of the band drive wheel providing a sufficient frictional force to drive the third pair of wheels.

In other words, the idler wheel is positioned or arranged such that the contact area between the band drive wheel and the drive band provides sufficient traction for transferring rotational movement of the band drive wheel to the drive band.

In an embodiment of the vehicle, the first motor comprises a housing rigidly connected to the cross-plate. The housing of the first motor may be connected to the cross-plate at an opposite side relative to the band drive wheel and the drive band.

The drive shaft of the first motor may extend through the cross-plate via a central aperture in the cross-plate.

In an embodiment of the vehicle, the cross-plate comprises a drive shaft aperture in the central portion of the cross-plate, through which aperture the drive shaft of the first motor may extend, and through holes for mounting bolts connecting the housing to the cross-plate.

In an embodiment of the vehicle, the cross-plate is connected to the fourth pair of wheels by a first shaft and a second shaft. The first and second shaft is arranged such that the third and fourth pair of wheels are kept at the same level.

In an embodiment, the cross-plate comprises a wheel shaft aperture, for one of the first and the second shaft, arranged at each of the end portions.

In an embodiment of the vehicle, the drive shaft aperture in the central portion of the cross plate is arranged at a level above the level of the wheel shaft apertures arranged at each of the end portions. The drive shaft aperture in the central portion of the cross plate may be arranged at a level below an upper level of the wheels of the third pair of wheels.

In an embodiment of the vehicle, a shaft of the idler wheel is arranged at a level below the level of the drive shaft.

In an embodiment of the vehicle, each wheel of the third pair of wheels is connected to a corresponding wheel of the fourth pair of wheels by the first shaft and the second shaft, respectively. Each of the first and second shafts may interconnect a wheel of the third pair of wheels to a corresponding wheel of the fourth pair of wheels having a common rotational axis. The third pair of wheels are connected to the fourth pair of wheels, such that the position of the third pair of wheels relative to the fourth pair of wheels is fixed during movement of the second set of wheels between the first position and the second position.

In an embodiment of the vehicle, the first and second shaft is arranged to transfer rotation, such that the first motor is able to drive both the third and the fourth pair of wheels.

In an embodiment of the vehicle, the wheel displacement assembly comprises a beam interconnecting the fourth pair of wheels and a second electric motor, the beam is connected to the second motor via a crank arm assembly, such that the second set of wheels may move between the first and the second position when the second motor is operated.

The beam may be substantially horizontal and arranged to be moved in a vertical and/or sideways direction by operating the second motor.

In an embodiment of the vehicle, the beam, the first shaft, the second shaft and the cross-plate are interconnected, such that the position of the third pair of wheels is fixed relative to the fourth pair of wheels. In other words, interconnected such that the third pair of wheels will move synchronously with the fourth pair of wheels when the wheel displacement assembly is operated, i.e. when the second motor is operated.

In an embodiment, the vehicle comprises a third motor featuring a drive shaft operatively connected to at least one wheel of each of the first pair of wheels and the second pair of wheels.

In a second aspect, the present invention provides a storage system comprising a vehicle according to any embodiment of the first aspect. The storage system may comprise a container storage structure having a plurality of storage columns for accommodating a vertical stack of storage containers and a rail system upon which the vehicle may move in two perpendicular directions above the storage columns.

BRIEF DESCRIPTION OF THE DRAWINGS

Embodiments of the invention is described in detail by reference to the following drawings:

FIGS. 4a and 4b are perspective views of the container handling vehicle in FIG. 3, wherein the second set of wheels are in a lowered position.

FIGS. 4c and 4d are perspective views of the container handling vehicle in FIG. 3, wherein the second set of wheels are in a raised position.

FIGS. 5a and 5b are perspective front views of a first exemplary container handling vehicle according to the invention, wherein the second set of wheels are in a lowered position.

FIGS. 6a and 6b are perspective front views of the container handling vehicle in FIGS. 5a and 5b, wherein the second set of wheels are in a raised position.

FIGS. 8a and 8b are perspective views of a second exemplary container handling vehicle according to the invention.

DETAILED DESCRIPTION OF THE INVENTION

Figure 1:
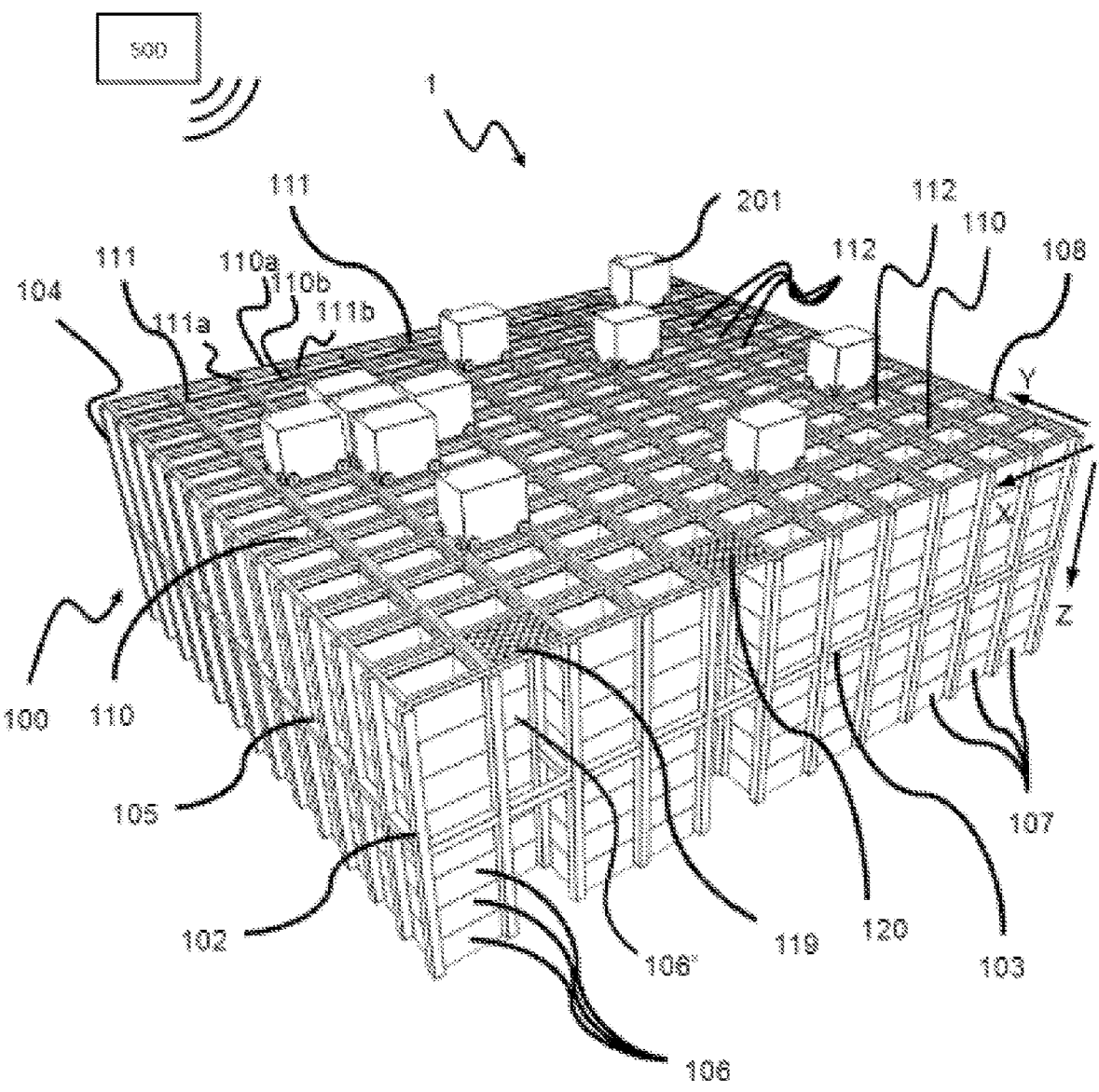
FIG. 1 is a perspective view of a framework structure of a prior art automated storage and retrieval system.
Figure 2:
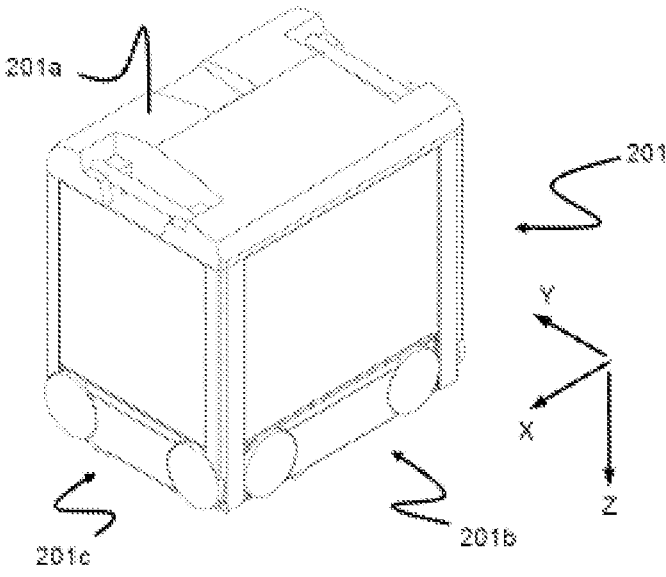
FIG. 2 is a perspective view of a prior art container handling vehicle having a centrally arranged cavity for carrying storage containers therein.
Figure 3:
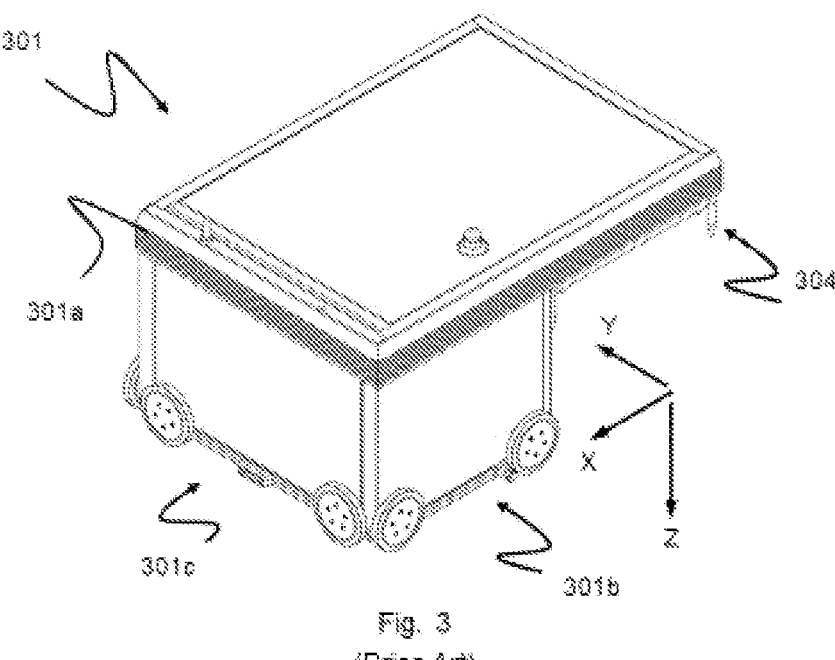
FIG. 3 is a perspective view of a prior art container handling vehicle having a cantilever for carrying storage containers underneath.

In the following, embodiments of the invention will be discussed in more detail with reference to the appended drawings. However, the drawings are not intended to limit the invention to the subject-matter depicted in the drawings.

The present invention is a remotely operated vehicle for use in an automated storage system featuring at least one rail system, e.g. a rail system 108 as discussed for the prior art storage system disclosed in FIG. 1.

Figure 9:
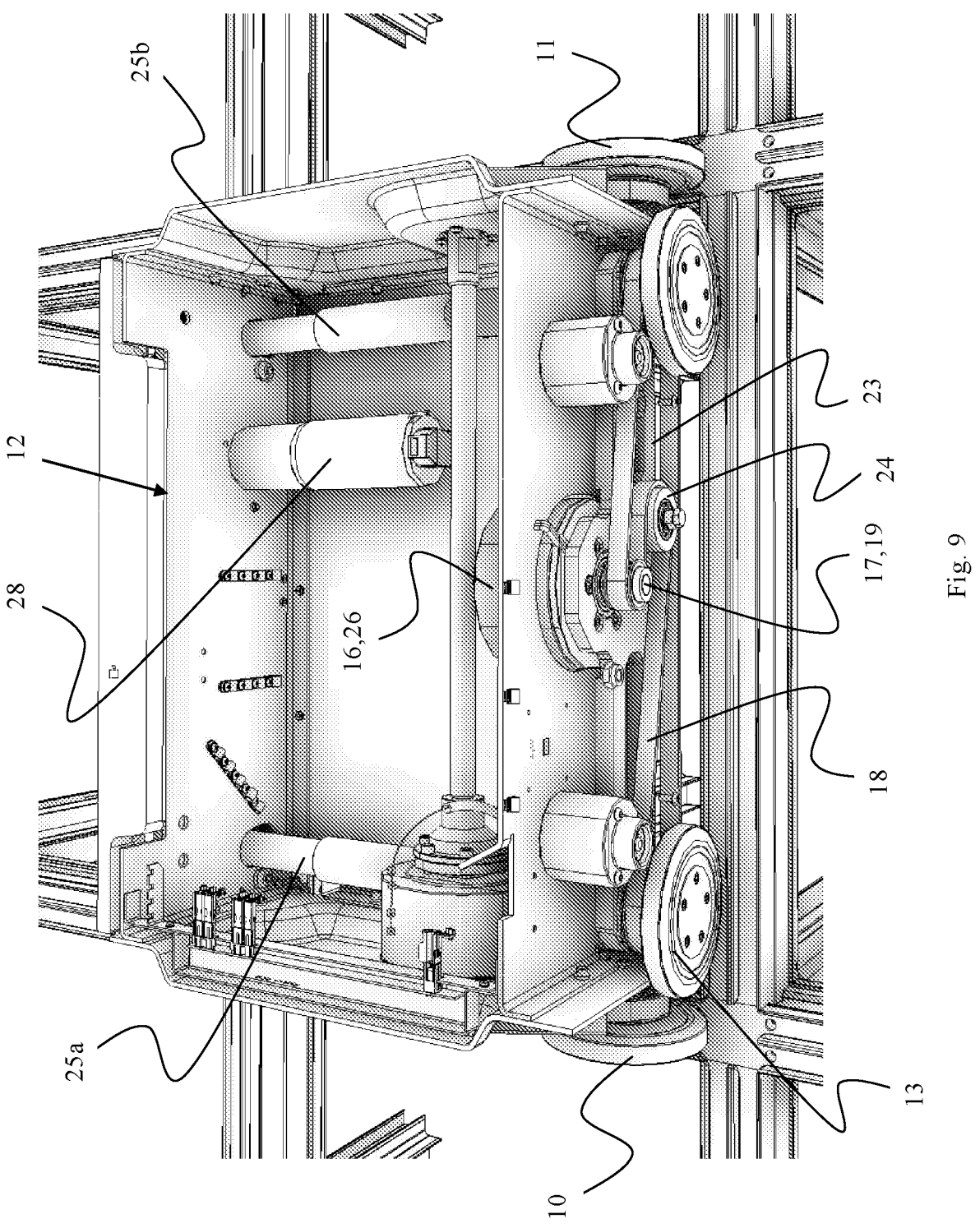
FIG. 9 is a perspective sectional top view of the container vehicle in FIGS. 5a and 5b.
Figure 10:
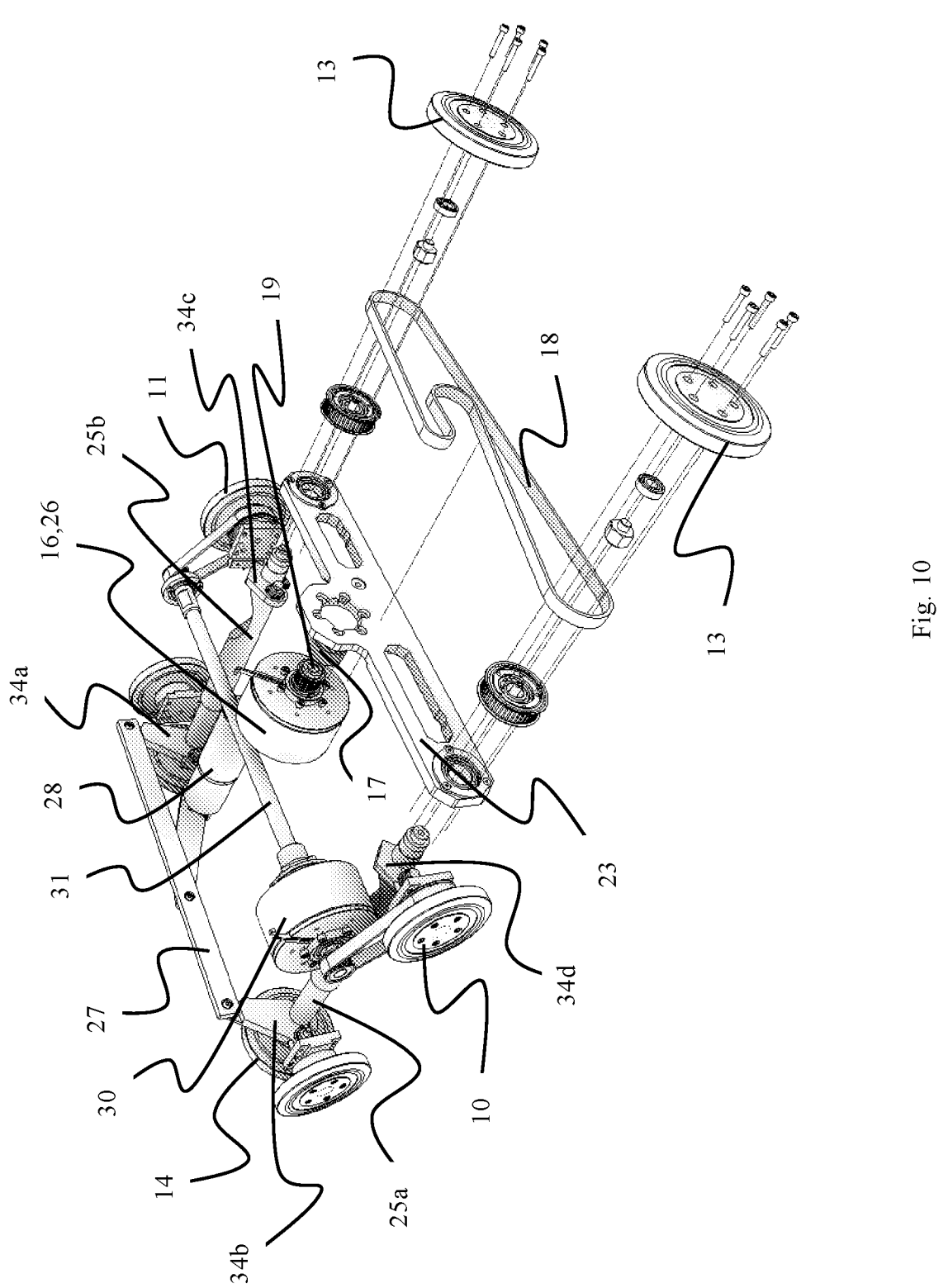
FIG. 10 is an exploded view of the wheel drive assembly and wheel displacement assembly of the container vehicle in FIGS. 5a and 5b.

A first exemplary embodiment of a remotely operated vehicle 401 according to the invention is shown in FIGS. 5-7 and further details of the vehicle are shown in FIGS. 9 and 10. The vehicle 401 is for picking up storage containers 106 in an automated storage system, e.g. as shown in FIG. 1, by use of a lifting device 33 arranged in a cantilevered section. The vehicle features a first set of wheels 401b arranged to allow movement of the vehicle along a first direction of a rail system 108 as shown in FIG. 1, e.g. along rails extending in a first direction X, and a second set of wheels 401c arranged to allow movement of the vehicle in a second direction, e.g. along rails extending in a second direction Y. The first set of wheels 401b features a first pair of wheels 10 and a second pair of wheels 11, while the second set of wheels 401c features a third pair of wheels 13 and a fourth pair of wheels 14. The pair of wheels of each set of wheels are arranged at opposite sides of a vehicle frame 12 or vehicle body.

Figure 7A:
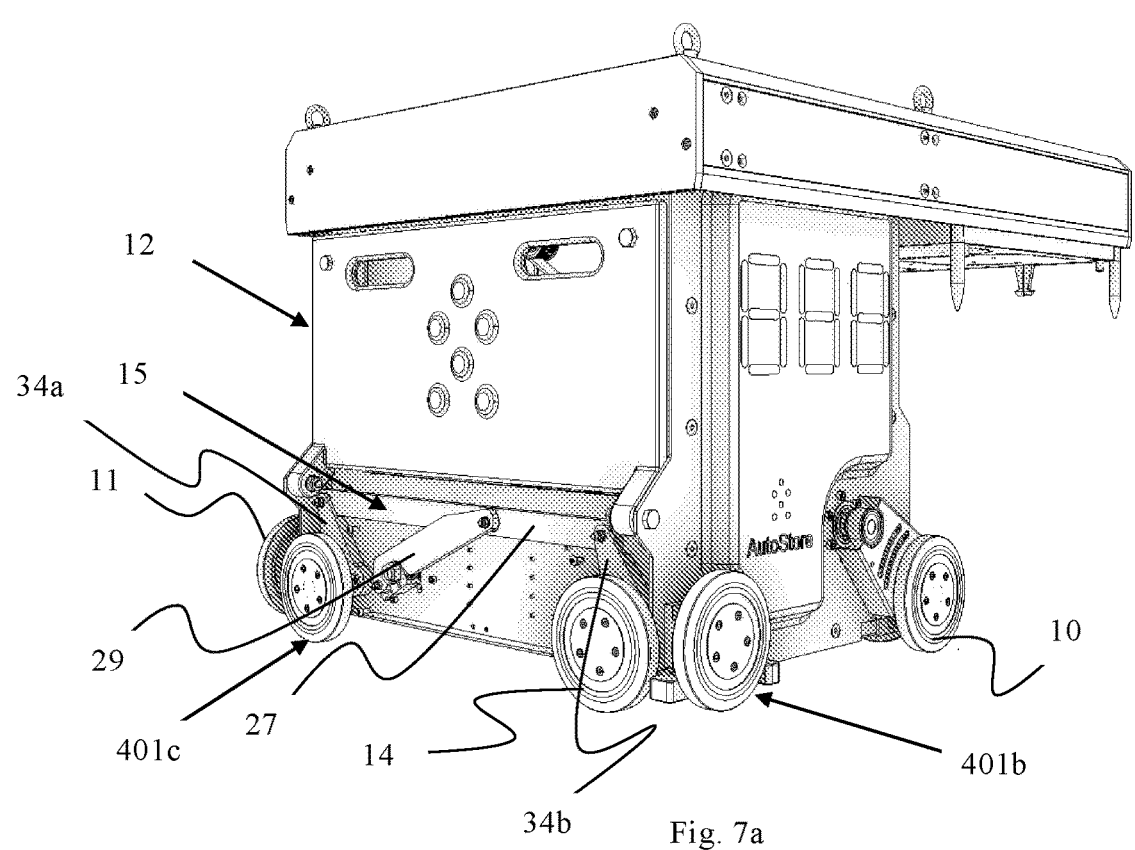
FIGS. 7a and 7b are perspective back views of the container handling vehicle in FIGS. 5a/5b and 6a/6b, respectively.
Figure 7B:
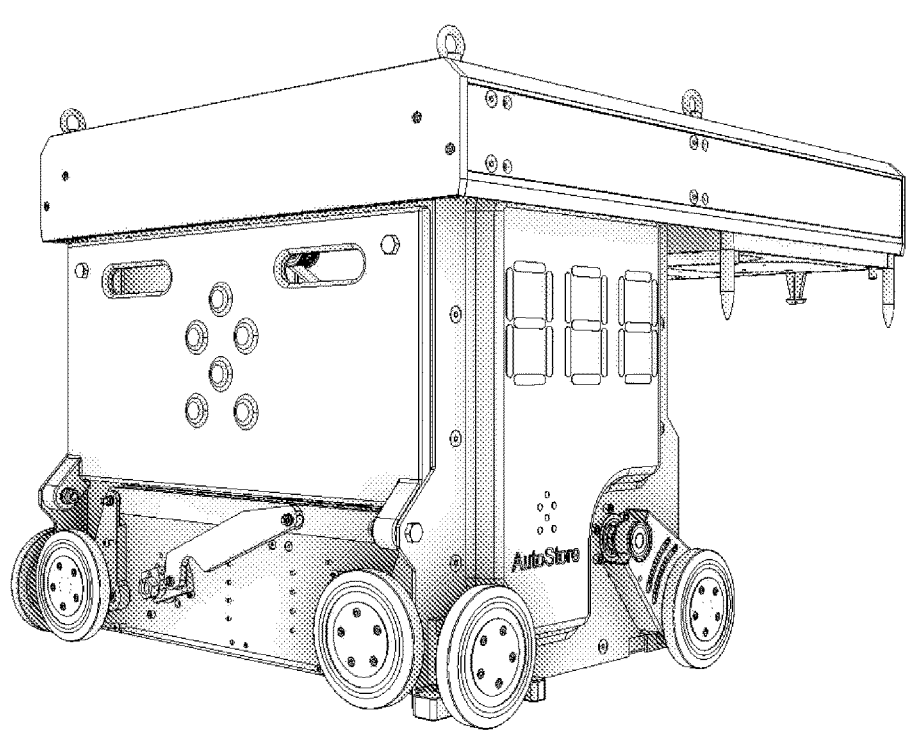

The exemplary vehicle according to the invention features a wheel displacement assembly 15, see FIGS. 7a and 7b, being similar in function to the wheel displacement assembly of the prior art vehicle 301 in FIGS. 4a-4d. The wheel displacement assembly is arranged to move the second set of wheels 401c, i.e. the third pair of wheels 13 and the fourth pair of wheels 14, in a vertical direction between a first position, wherein the first set of wheels 401b allows movement of the vehicle 401 along the first direction, see FIG. 7b, and a second position, wherein the second set of wheels 401c allows movement of the vehicle 401 along the second direction, see FIG. 7a.

The wheel displacement assembly 15 features a beam 27 interconnecting the wheels of the fourth pair of wheels 14, via a first pivot element 34a and a second pivot element 34b arranged at opposite ends of the beam, and a crank arm assembly 29.

Each of the wheels of the fourth pair of wheels 14 are connected to an opposite wheel of the third pair of wheels 13 by one of a first shaft 25a and a second shaft 25b, see FIGS.

9 and 10. The first shaft 25*a* and the second shaft 25*b* are mounted to the vehicle frame 12 via the first pivot element 34*a* and the second pivot element 34*b*, respectively, as well as the oppositely arranged third pivot element 34*c* and fourth pivot element 34*d*. The third pair of wheels is mounted on a cross-plate 23 interconnecting the first shaft 25*a* and the second shaft 25*b*.

The beam 27 is connected to a second electric motor 28 via the crank arm assembly 29. When the second motor is operated, the crank assembly will move the beam in a vertical and sideways direction, see FIGS. 7*a* and 7*b*. The movement of the beam will simultaneously move the first and second pivot elements 34*a*,34*b*, which in turn will raise or lower the first and second shaft 25*a*,25*b* and the second set of wheels 401*c* in a vertical direction, e.g. between the first and the second position. The first and second shaft ensures that the vertical movement relative to the vehicle frame 12 is equal for the third and fourth pair of wheels 13,14.

The vehicle 401 has a drive assembly featuring a first electric motor 16 having a drive shaft 19. The drive shaft 19 is arranged to drive the third pair of wheels 13 of the second set of wheels 401*c* via a drive band 18, a band drive wheel 17 and an idler wheel 24. The drive shaft 19 and the band drive wheel 17 are connected and have a common rotational axis. The simplified construction of the drive assembly shown in FIG. 4*b* may use an electric motor running at a lower rpm and having higher torque than the electric motor of the prior art vehicle.

The third pair of wheels 13, the first electric motor 16 and the idler wheel 24 are all mounted on the cross-plate 23. This arrangement ensures that the position of the band drive wheel 17 and the idler wheel 24 relative to the third pair of wheels 13 is always fixed, also during movement of the second set of wheels 401*c* between the first position and the second position. Consequently, the length of the drive band 18 is constant and does not change during operation of the wheel displacement assembly. In other words, the drive band 18 does not experience repeated stretching and contraction which may otherwise shorten the service life of the drive band.

A sidewall 35 of the vehicle body 12 (or vehicle frame) features an opening 36 through which the housing 26 of the first electric motor 16 is arranged, see FIG. 5*b*. The opening being sized to allow vertical movement of the housing 26 relative to the vehicle body 12.

In this embodiment, the first and second shaft 25*a*,25*b* do not transfer rotary motion from the wheel drive assembly to the fourth pair of wheels 14 since this is not required for obtaining an adequate movement of the vehicle 401 upon a rail system 108. However, in alternative embodiments, rotary motion may also be transferred to the fourth pair of wheels via suitable drive shafts similar to the first and second shaft 25*a*,25*b*.

The first set of wheels 401*b* are driven by a third electric motor 30 connected to a drive shaft 31.

A second exemplary embodiment of a remotely operated vehicle 501 according to the invention is shown in FIGS. 8*a* and 8*b*. The vehicle is adapted for accommodating a container in a container carrier 32 and to transport the container upon a rail system, e.g. a rail system 108 as shown in FIG. 1 or a transfer rail grid as disclosed in e.g. WO 2019/238694 A1. The vehicle 501 features a wheel drive assembly and wheel displacement assembly having the same functions and features as described above for the first exemplary embodiment.

LIST OF REFERENCE NUMBERS

1 Prior art automated storage and retrieval system
10 First pair of wheels
11 Second pair of wheels
12 Vehicle body, vehicle frame
13 Third pair of wheels
14 Fourth pair of wheels
15 Wheel displacement assembly
16 First electric motor
17 Band drive wheel
18 First drive band, drive band
19 Drive shaft
20 Gear wheel
21 Second drive band
22 Wheel support
23 Cross-plate, cross-member
24 Idler wheel
25*a* First shaft
25*b* Second shaft
26 Housing
27 Beam
28 Second electric motor
29 Crank arm assembly
30 Third electric motor
31 Drive shaft
32 Container carrier
33 Lifting device
34*a-d* Pivot element
35 Sidewall
36 Opening (in sidewall)
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
111*a* First rail of second direction (Y)
111*b* Second rail of second direction (Y)
112 Access opening
119 First port column
120 Second port column
201 Prior art storage container vehicle
201*a* Vehicle body of the storage container vehicle 201
201*b* Drive means/wheel arrangement, first direction (X)
201*c* Drive means/wheel arrangement, second direction (Y)
301 Prior art cantilever storage container vehicle
301*a* Vehicle body of the storage container vehicle 301
301*b* Drive means in first direction (X)
301*c* Drive means in second direction (Y)
304 Gripping device
500 Control system
X First direction
Y Second direction
Z Third direction

The invention claimed is:

1. A remotely operated vehicle for moving on a rail system, the rail system comprising a first set of parallel rails and a second set of parallel rails arranged perpendicular to the first set of rails, the vehicle comprising a first set of wheels comprising a first pair of wheels and a second pair of wheels, the first and second pairs of wheels arranged on opposite sides of a vehicle frame, allowing movement of the vehicle along a first direction on the rail system during use;

a second set of wheels comprising a third pair of wheels and a fourth pair of wheels, the third and fourth pairs of wheels arranged on opposite sides of the vehicle frame, allowing movement of the vehicle along a second direction (Y) on the rail system during use, the second direction (Y) being perpendicular to the first direction (X);

a wheel displacement assembly mounted to the vehicle frame and arranged to move the second set of wheels in a vertical direction (Z) relative to the vehicle frame between a first position, wherein the first set of wheels allows movement of the vehicle along the first direction (X), and a second position, wherein the second set of wheels allows movement of the vehicle along the second direction; and a wheel drive assembly comprising a first motor, a drive band and a band drive wheel, the first motor operatively connected to rotate the band drive wheel, and the drive band interconnecting the band drive wheel and the third pair of wheels, wherein the third pair of wheels and the first motor are mounted to a cross-plate which extends horizontally and is arranged to move vertically as part of the wheel displacement assembly, the third pair of wheels and the band drive wheel being attached to the cross-plate such that the cross-plate supports the third pair of wheels and the band drive wheel in a fixed spatial configuration where each wheel of the third pair of wheels is located at an end portion of the cross-plate and the band drive wheel is positioned at a central portion of the cross-plate, wherein the first motor comprises a housing rigidly connected to the cross-plate at an opposite side relative to the third pair of wheels, the band drive wheel and the drive band.

2. A vehicle according to claim 1, wherein the first motor comprises a drive shaft, and the band drive wheel is connected to the drive shaft, such that the band drive wheel and the drive shaft have a common axis of rotation.

3. A vehicle according to claim 1, comprising an idler wheel attached to the cross-plate such that the cross-plate supports the idler wheel, the third pair of wheels and the band drive wheel in a fixed spatial configuration, the idler wheel positioned in a central portion of the cross-plate and arranged to change the direction of the drive band such that a contact area between the band drive wheel and the drive band is extended.

4. A vehicle according to claim 1, wherein the cross-plate is connected to the fourth pair of wheels by a first shaft and a second shaft.

5. A vehicle according to claim 4, wherein each wheel of the third pair of wheels is connected to a corresponding wheel of the fourth pair of wheels by one of the first shaft and the second shaft, respectively.

6. A vehicle according to claim 1, wherein the wheel displacement assembly comprises a beam interconnecting the wheels of the fourth pair of wheels and a second motor, the beam is connected to the second motor via a crank arm assembly, such that the second set of wheels may move between the first and the second position when the second motor is operated.

7. A vehicle according to claim 1, wherein a beam, a first shaft, a second shaft and the cross-plate are interconnected, such that the position of the third pair of wheels is fixed relative to the fourth pair of wheels.

8. A vehicle according to claim 1, comprising a third motor featuring a drive shaft operatively connected to at least one wheel of each of the first pair of wheels and the second pair of wheels.

9. A vehicle according to claim 1, wherein a sidewall of the vehicle frame features an opening through which the housing of the first motor is arranged, the opening being sized to allow vertical movement of the housing relative to the vehicle frame.

10. A vehicle according to claim 2, wherein the drive shaft extends through the cross-plate via a central aperture in the cross-plate.

11. A storage system comprising:

a remotely operated vehicle for moving on a rail system, the rail system comprising a first set of parallel rails and a second set of parallel rails arranged perpendicular to the first set of rails, the vehicle comprising:

a first set of wheels comprising a first pair of wheels and a second pair of wheels, the first and second pairs of wheels arranged on opposite sides of a vehicle frame, allowing movement of the vehicle along a first direction on the rail system during use;

a second set of wheels comprising a third pair of wheels and a fourth pair of wheels, the third and fourth pairs of wheels arranged on opposite sides of the vehicle frame, allowing movement of the vehicle along a second direction on the rail system during use, the second direction being perpendicular to the first direction;

a wheel displacement assembly mounted to the vehicle frame and arranged to move the second set of wheels in a vertical direction relative to the vehicle frame between a first position, wherein the first set of wheels allows movement of the vehicle along the first direction, and a second position, wherein the second set of wheels allows movement of the vehicle along the second direction; and a wheel drive assembly comprising a first motor, a drive band, and a band drive wheel, the first motor operatively connected to rotate the band drive wheel, and the drive band interconnecting the band drive wheel and the third pair of wheels, wherein the third pair of wheels and the first motor are mounted to a cross-plate which extends horizontally and is arranged to move vertically as part of the wheel displacement assembly, the third pair of wheels and the band drive wheel being attached to the cross-plate such that the cross-plate supports the third pair of wheels and the band drive wheel in a fixed spatial configuration where each wheel of the third pair of wheels is located at an end portion of the cross-plate and the band drive wheel is positioned at a central portion of the cross-plate, wherein the first motor comprises a housing rigidly connected to the cross-plate at an opposite side relative to the third pair of wheels, the band drive wheel and the drive band.

12. A storage system according to claim 11, the storage system further comprising a container storage structure having a plurality of storage columns for accommodating a vertical stack of storage containers and a rail system upon which the vehicle may move in two perpendicular directions above the storage columns.

\* \* \* \* \*